United States Patent
Achleitner et al.

(10) Patent No.: US 10,245,657 B2
(45) Date of Patent: Apr. 2, 2019

(54) TWIST DRILL AND PRODUCTION METHOD

(71) Applicant: Hilti Aktiengesellschaft, Schaan (LI)

(72) Inventors: Corinna Achleitner, Bludenz (AT); Guenter Domani, Weissenberg (DE); Mark Winkler, Hohenems (AT); Carsten Peters, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 642 days.

(21) Appl. No.: 14/889,125

(22) PCT Filed: Apr. 29, 2014

(86) PCT No.: PCT/EP2014/058684
§ 371 (c)(1),
(2) Date: Nov. 4, 2015

(87) PCT Pub. No.: WO2014/180709
PCT Pub. Date: Nov. 13, 2014

(65) Prior Publication Data
US 2016/0074945 A1    Mar. 17, 2016

(30) Foreign Application Priority Data
May 6, 2013  (EP) .................................... 13166671

(51) Int. Cl.
| B23B 51/02 | (2006.01) |
| B21H 3/10 | (2006.01) |
| E21B 10/44 | (2006.01) |
| B23P 15/32 | (2006.01) |

(52) U.S. Cl.
CPC ................ B23B 51/02 (2013.01); B21H 3/10 (2013.01); B23P 15/32 (2013.01); E21B 10/445 (2013.01); *B23B 2251/406* (2013.01)

(58) Field of Classification Search
CPC ..... B23B 51/02; B23B 2251/406; B21H 3/10; B23P 15/32
USPC ......................................................... 175/414
See application file for complete search history.

(56) References Cited

U.S. PATENT DOCUMENTS

| 5,096,344 | A | 3/1992 | Fischer |
| 6,601,659 | B2 | 8/2003 | Saitta et al. |
| 7,021,872 | B2 | 4/2006 | Hauptmann et al. |
| 2002/0053472 | A1* | 5/2002 | Kleine ................... B23B 51/02 175/394 |
| 2004/0052597 | A1 | 3/2004 | Defougeres et al. |
| 2014/0328641 | A1 | 11/2014 | Peters et al. |

FOREIGN PATENT DOCUMENTS

| CN | 1386604 | 12/2002 |
| CN | 101116938 | 2/2008 |
| CN | 202506878 | 10/2012 |
| DE | 102011085187 | 12/2012 |

(Continued)

*Primary Examiner* — Taras P Bemko
(74) *Attorney, Agent, or Firm* — Davidson, Davidson & Kappel, LLC

(57) ABSTRACT

The twist drill (1) has a drilling head (3), a continuous two-flute, three-flute to six-flute helix (4) and an insertion end (5) that are arranged consecutively on a drill axis (2). The helix (4) has a radial outer dimension (18) that varies periodically two, three to six times per revolution around the drill axis (2). The invention also relates to a production method for such a drill.

7 Claims, 6 Drawing Sheets

(56) References Cited

FOREIGN PATENT DOCUMENTS

| | | |
|---|---|---|
| EP | 0470354 | 2/1992 |
| EP | 1621274 | 2/2006 |
| FR | 2808462 | 11/2001 |

* cited by examiner

TWIST DRILL AND PRODUCTION METHOD

The present invention relates to a twist drill and to a production method for a twist drill, especially for twist drills for drill-chiseling work in rock and concrete as well as in reinforcements.

BACKGROUND

Drills for work in rock, reinforced concrete, etc. are disclosed, for example, in U.S. Pat. No. 7,021,872. The helix is primarily meant to remove drill cuttings from the drilled hole. The classic spiral-shaped helices have proven their worth in this respect, not only because of the reliable transport of the drill cuttings but also because of the moderate production effort involved. Especially due to the production methods employed, however, the classic helix entails compromises when it comes to other properties. One aspect is the friction of the helix against the wall of the drilled hole.

SUMMARY OF THE INVENTION

The present invention provides a twist drill having a drilling head, a continuous two-flute, three-flute to six-flute helix and an insertion end that are arranged consecutively on a drill axis. The helix has a radial outer dimension that varies periodically two, three to six times per revolution around the drill axis. The outer dimension preferably varies by a maximum of 10% and preferably by at least 2%.

The twist drill has a continuous helix along its entire revolution and this contributes to the removal of the drill cuttings. The varying diameter of the helix flute is responsible for the fact that the helix only comes into contact with a few points of the wall of the drilled hole. This can reduce the friction.

The production method according to the invention for a twist drill encompasses the following steps: a plurality of depressions is milled into the circumferential surface of a blank in order to form a network of ribs. The first ribs, which are parallel to each other, run along the axis of the blank, while the second ribs, which are parallel to each other, run at an angle of inclination that is slanted relative to the first ribs. The first ribs have sections situated between adjacent second ribs. Grooves are milled into these sections. A drilling head is formed on an end face of the milled blank.

The two-phase milling method is an efficient method for the production of the drill, and it concurrently allows new design freedom when it comes to the shape of the drill.

The depressions can be milled in rows that are oriented parallel to each other and along the axis. The depressions that are adjacent to each other along the axis can overlap along the axis. Depressions that are adjacent to each other in the circumferential direction can be at a distance from each other in the circumferential direction.

One embodiment provides for a surface of the depressions to be concave in every direction. In terms of the curvature, the shape of the depressions deviates markedly from the helix that is to be created. However, it has been shown that the concave depressions are sufficient in order to produce a desired helix. Advantageously, the depressions make fewer requirements of the milling tools than in the case of the direct milling of a groove in the form of the helix.

One embodiment provides for the grooves to run parallel to the second ribs. A surface of the grooves can be convex in a direction parallel to the second ribs. The grooves are milled over the depressions. The grooves coincide with the convex course of the bottom of a classic helix.

One embodiment provides for the grooves to be milled at a depth that deviates by less than 10% from the depth of the depressions.

BRIEF DESCRIPTION OF THE DRAWINGS

The description below explains the invention on the basis of embodiments and figures given by way of examples. The figures show the following.

Unless otherwise indicated, identical or functionally equivalent elements are designated in the figures with the same reference numerals.

DETAILED DESCRIPTION

Figure 1:
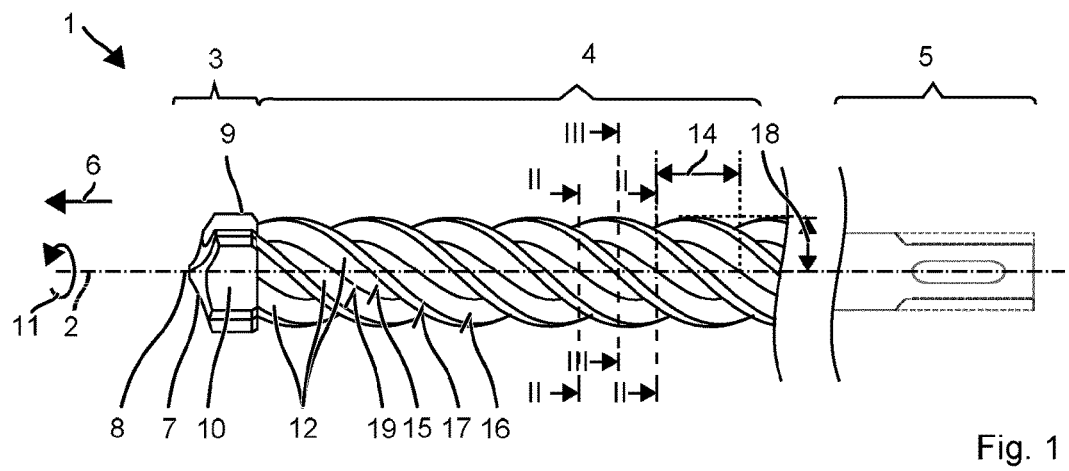
FIG. 1: a twist drill.

FIG. 1 schematically shows a simplified view of a twist drill 1 by way of an example. The twist drill 1 has a drilling head 3, a spiral helix 4 and an insertion end 5, all arranged consecutively along a drill axis 2.

The depicted twist drill 1 is designed for working reinforced stone, especially for a chiseling action that is superimposed onto the rotational movement. The drilling head 3 has four chisel edges 7 facing in the impact direction 6. The chisel edges 7 are each formed as a line of intersection of a leading surface in the rotational direction of the drill 1 and a trailing surface, both surfaces being slanted relative to the drill axis 2 as well as relative to each other by at least 60°. The chisel edges 7 run essentially in the radial direction, for instance, starting at the tip 8 of the drilling head 3 all the way to an edge of the drilling head 3, where the chisel edges 7 are preferably recessed with respect to the tip 8 in the impact direction 6. The inclination of the chisel edges 7 relative to the axis 3 can be constant in the radial direction, or else, in the area of the tip 8, it can be less than at the edge. In particular, the chisel edge 7 at the edge can run perpendicular to drill axis 2. At the edge of the drilling head 3, adjoining the chisel edges 7 facing in the impact direction 6, there is a cutting edge 9 that runs parallel to the axis 3. The cutting edge 9 preferably projects radially beyond the helix 4. The circumference of the drilling head 3 is provided with removal grooves 10 which run parallel to the drill axis 2 and through which the drill cuttings can be transported out of the drilled hole. In the circumferential direction 11, the removal grooves 10 are situated between the chisel edges 7. The drilling head 3 is preferably a monolithic body made of sintered hard metal that contains, for example, tungsten carbide and a metal binder. The depicted drilling head 3 has two pairs of differently configured chisel edges, of which the chisel edges that form the tip 8 are referred to as the main cutting blades, while the other pair is referred to as the secondary cutting blades. Instead of four chisel edges, the chiseling body can also have two, for instance, only the main cutting blades, or else three or more than four chisel edges.

The helix 4 has several helical lands 12 that are arranged around a rotationally symmetrical core 13. The number of lands 12 is preferably the same as the number of chisel edges 7. The helix 4 shown by way of an example has four lands 12, that is to say, it is a four-flute helix. The lands 12 are arranged, for example, at identical angular distances in the circumferential direction 11, for instance, at a distance of 90°. The axial distance 14 between adjacent lands 12 is preferably of the same magnitude and constant along the drill axis 2. In the example shown, the axial distance 14 is one-fourth of the pitch of a land 12.

The lands 12 preferably have the same dimensions and the same shape. The surface of the land 12 has two flanks 15, 16 that wind helically around the drill axis 2. The first of the flanks 15 continuously faces the drilling head 3 while the second of the flanks 16 continuously faces away from the drilling head 3. The radial distance from the first flank 15 to the drill axis 2 increases essentially monotonically in the circumferential direction 11, while the radial distance from the second flank 16 decreases essentially monotonically in the circumferential direction 11. The transition between the first flank 15 and the second flank 16—in other words, their radially projecting edges—forms the margin 17. The margin 17 can be a helical strip that is oriented essentially perpendicular to the drill axis 2, or else, geometrically simplified, it can be a continuous line wound around the drill axis 2. Among all of the cross sections through the land 12 that are oriented perpendicular to the drill axis 2, the uninterrupted line along the drill axis 2 encompasses the point that is at the greatest distance 18 from the drill axis 2. The distance 18 will be referred to hereinafter as the height 18 of the margin 17.

Each spiral-shaped helix bottom 19 runs between two adjacent lands 12. The helix bottom 19 can be a continuous helical line or a strip that is oriented essentially perpendicular to the drill axis 2. The helix bottom 19 is at the smallest radial distance from the drill axis 2. The core 13 is exposed at the helix bottom 19.

The cross section of a classic helix has a shape and a dimension that remain constant along the axis. The cross section in one plane can be projected congruently onto all cross sections in parallel planes merely by a rotation around the drill axis. In particular, the height of the margin is constant.

Figures 2, 3:
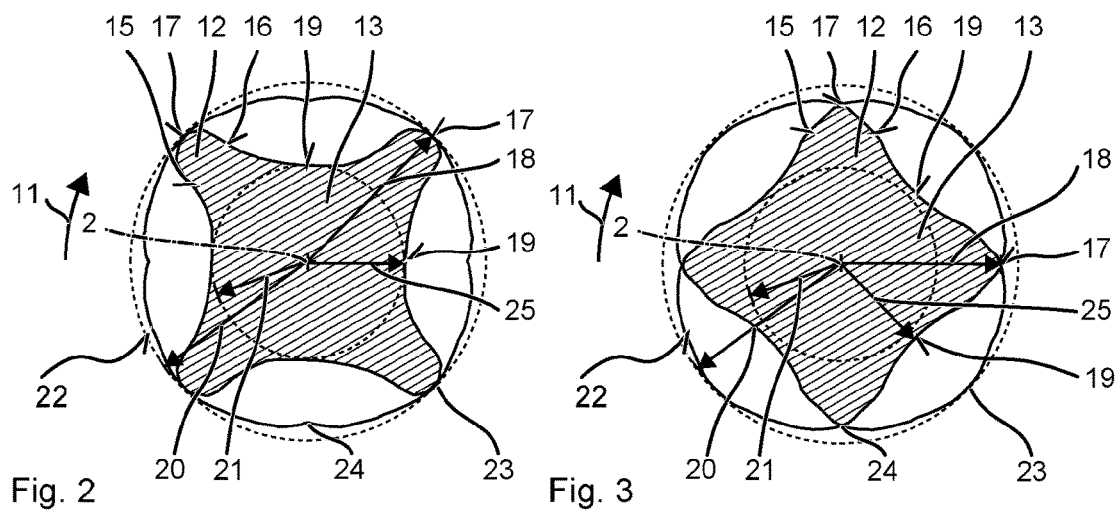
FIG. 2: a cross section II-II through the helix of the twist drill.
FIG. 3: a cross section III-III through the helix of the twist drill.

The shape of the cross section of the helix 4 of the twist drill 1 changes periodically along the drill axis 2. The shape is preferably repeated with the axial distance 14 of the adjacent lands 12, that is to say, the periodicity is preferably equal to the inverse of the axial distance 14. FIG. 2 shows a first cross section in the plane II-II perpendicular to the drill axis 2, FIG. 3 shows a second cross section in the plane III-III parallel to the plane II-II. The offset between the two planes II-II and III-III corresponds to half the period, that is to say, half of the axial distance 14 between two adjacent lands 12. As can be seen in FIGS. 2 and 3, the cross sections in the planes II-II and III-III cannot be projected congruently onto each other by a rotation, which will be referred to below as a different shape. All of the cross sections within a half period have a different shape.

The helix 4 is milled into a cylinder with a constant outer radius 20. Moreover, a full cylinder (core 13) with a constant inner radius 21 can be milled into the helix 4. The cylinders are shown by a broken line in FIGS. 2 to 4. The radial outer dimension 18 of the helix 4 changes periodically along the drill axis 2. The radial outer dimension 18 is greater in the plane II-II than in the plane III-III. Accordingly, the helix 4 is only punctually in contact with the circumscribing cylinder. The radial outer dimension 18 preferably varies by up to 10%, preferably by at least 2%. The variation of the amplitude is limited with an eye towards achieving a continuous transport of the drill cuttings. A slight variation, for instance, by a corrugation of the margin 17, in contrast, entails clogging caused by the fine-grain drill cuttings and can detrimentally lead to increased friction between the adhering drill cuttings and the wall of the drilled hole. The radial outer dimension 18 varies slowly, for example, three to six times per complete revolution of a margin 17, here, for instance, four times. The profile 22 of the helix 4, which is defined by the varying outer dimension 18, has a corresponding three-fold to six-fold axis of symmetry.

Figure 4:
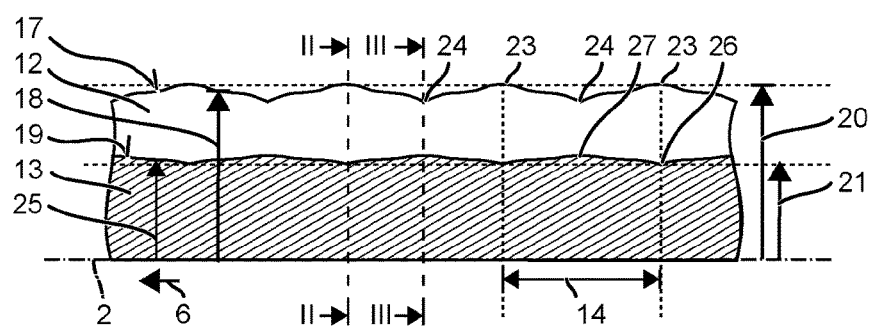
FIG. 4: a sectional view along the helical bottom of the helix.

FIG. 4 shows a sectional view of the margin 17 in a depiction unrolled around the drill axis 2. The section IV-IV is helical and follows the helix bottom 19 (abscissa and ordinate are not true-to-scale). The margin 17 has a height 18 that varies periodically along the drill axis 2. The points (margins 17) that are farthest away from the drill axis 2 in the appertaining cross sections perpendicular to the drill axis 2 are at a different distance (height 18) from the drill axis 2. Along the drill axis 2, the height 18 has periodically consecutive maxima that are at constant intervals 14 and that will be referred to below as peaks 23, and it has minima that are between the peaks 23 and that will be referred to below as valleys 24. The height 18 varies between the peak 23, in other words, the maximum value, and the valley 24, the minimum value, by up to 10%, preferably by at least 3%. During drilling, only the peaks 23 of the helix 4 are in contact with the wall of the drilled hole. As a result, friction losses, especially in case of deep drilled holes, can be reduced.

The margin 17 preferably has the same number of peaks 23 per revolution around the drill axis 2 as the helix 4 has lands 12. The axial distance of adjacent peaks 23 is preferably equal to the axial distance 14 of adjacent margins 17. The distance of two peaks 23 of a margin 17 in the circumferential direction 11 is equal to the subdivision of the circumference by the multiple lands 12, which is 90° in the example shown.

The lands 12 preferably have the same dimension, the same shape and their arrangement is rotationally symmetrical. In the circumferential direction 11, the peak 23 of a margin 17 is opposite from it the peak 23 of the adjacent margin 17. Consequently, the peak 23 of a margin 17 is preferably in a plane II-II perpendicular to the drill axis 2, in each case, with a peak 23 of each of the other margins 17. In the example shown in FIG. 2, each of the four helices 4 has a peak 23 in the plane II-II. Moreover, the peak 23 of a margin 17 can preferably be opposite from the peak 23 of the adjacent margin 17 in the axial direction. Each peak 23 is located on one of four straight lines that run parallel to the drill axis 2 and that are arranged at equal angular distances, here 90°, around the drill axis 2. The number of straight lines matches the number of lands 12.

The valleys 24, that is to say, the minima of the height 18, are at about half the distance between two consecutive peaks 23.

The helix bottom 19 can be at a constant radial distance 25 along the drill axis 2. In the embodiment given by way of an example, this results in a small periodic variation of the helix bottom 19 along the drill axis 2. The minima 26 of the radial distance 25 of the helix bottom 19 are preferably in planes II-II that are perpendicular to the drill axis 2, together with the peaks 23 of the margin. The maxima 27 of the radial distance 25 of the helix bottom 19 are preferably in planes III-III that are perpendicular to the drill axis 2, together with the valleys 24 of the margin. Therefore, the helix bottom 19 and the margin 17 have a slant that runs counter to the drill axis 2.

The production method described below for the twist drill 1 deals primarily with the production of the helix 4. The described production of the insertion end 5 and the production or installation of the drilling head 3 are merely preferred embodiments.

Figure 5:
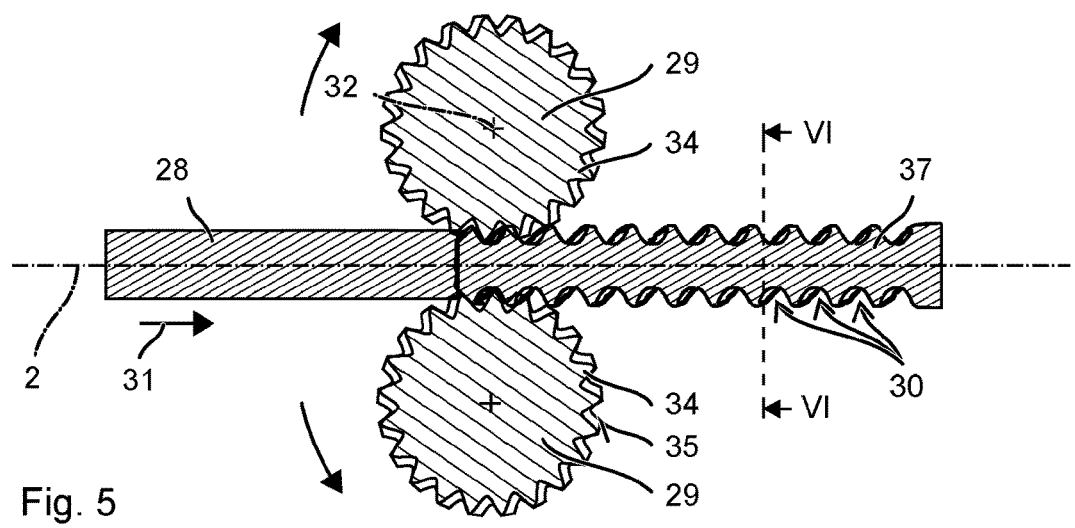
FIG. 5: a sectional view through a first rolling mill stand.
Figure 6:
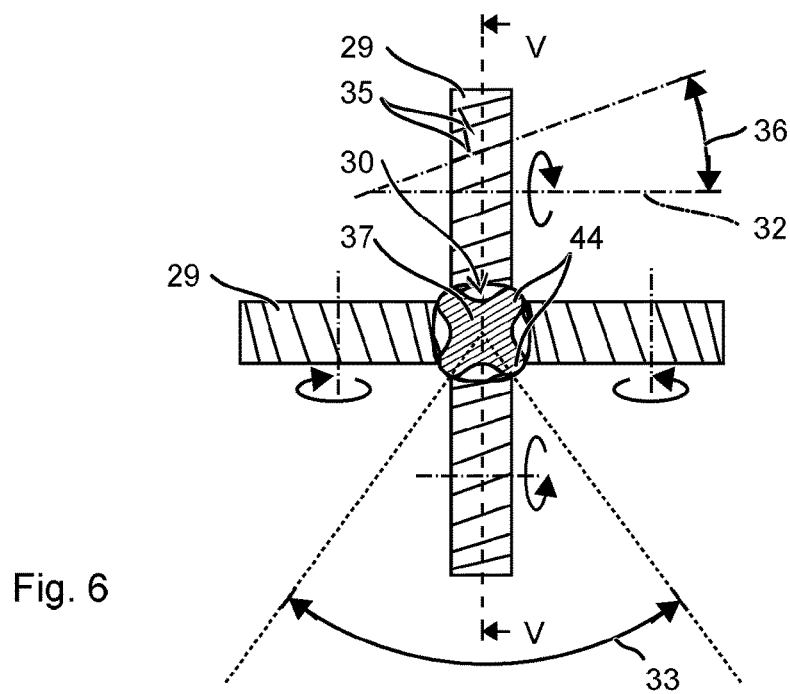
FIG. 6: a sectional view VI-VI through the semi-finished product, in the viewing direction of the first rolling mill stand.

FIGS. 5 and 6 schematically show a first processing of a blank 28 in a longitudinal section V-V or cross section VI-VI. The blank 28 is, for example, a cylindrical wire. With an eye towards easier processing, the cross section of the blank 28 is preferably circular, although it can also have other approximately circular shapes, e.g. it can be polygonal or oval.

The production method presented here comprises cutting the blank 28 to the desired length, for instance, the length of the helix 4 or the length of the twist drill 1 including the insertion end 5, before the subsequent shaping steps are carried out. In a preferred variant, the helix 4 is first shaped into the blank 28 and the shaped blank is subsequently cut into several helices 4.

A first rolling mill stand equipped with four milling tools 29 is used to provide the blank 28 with a plurality of depressions 30. The depressions 30 are milled by means of longitudinal milling. The advancing direction 31 of the blank 28 runs parallel to its axis 2. The milling tools 29 roll on the blank 28 parallel to the axis 2 of the blank 28. A rotational axis 32 or pivot axis of the milling tools 29 runs parallel to the axis 2 and to the advancing direction 31 of the blank 28.

The milling tools 29 are preferably configured so as to be identical. Moreover, the milling tools 29 are arranged at equal angular distances around the axis 2 of the blank 28. Therefore, each of the milling tools 29 processes a different angular section 33 of the blank 28 and, in the angular section 33, it forms a row of depressions 30 arranged consecutively along the axis 2. The distance of adjacent depressions 30 along the axis 28 is preferably constant.

The milling tool 29 essentially has the shape of a helically toothed wheel with several teeth 34 arranged along the circumference. The teeth 34 are, for instance, prismatic, that is to say, their cross section is constant along the rotational axis 32. The cross section shown by way of an example is in the form of a pitch circle, in other words, the teeth 34 have the shape of a cylinder segment. The head line 35 of the teeth 34 is slanted vis-à-vis the rotational axis 32. The angle of inclination 36 between the rotational axis 32 and the head line 35 is within the range between 30° and 60°. The teeth 34 are preferably all configured so as to be identical.

Figure 7:
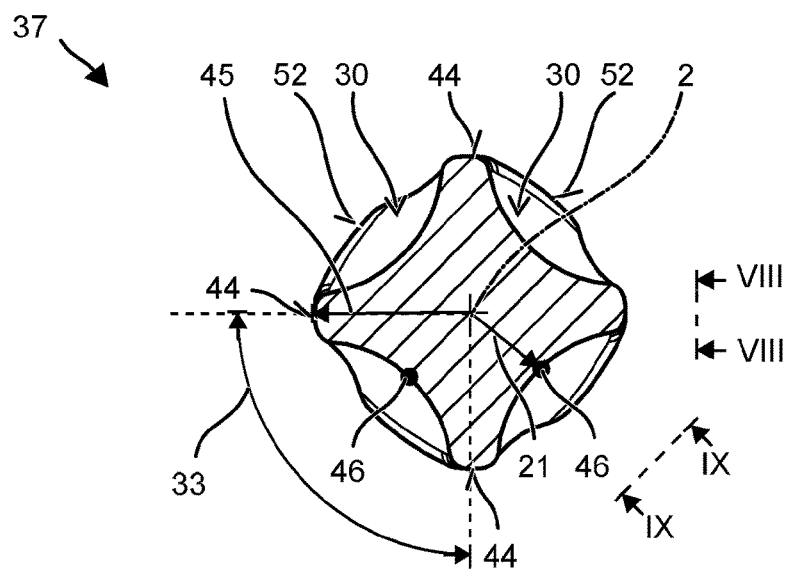
FIG. 7: a cross section VII-VII through the semi-finished product.
Figure 8:
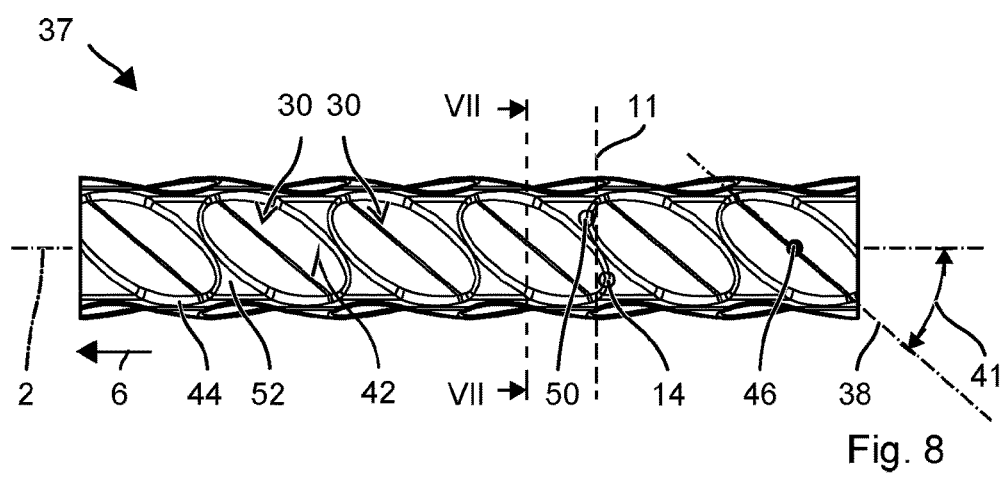
FIG. 8: a first side view of the semi-finished product, in the viewing direction VIII.
Figure 9:
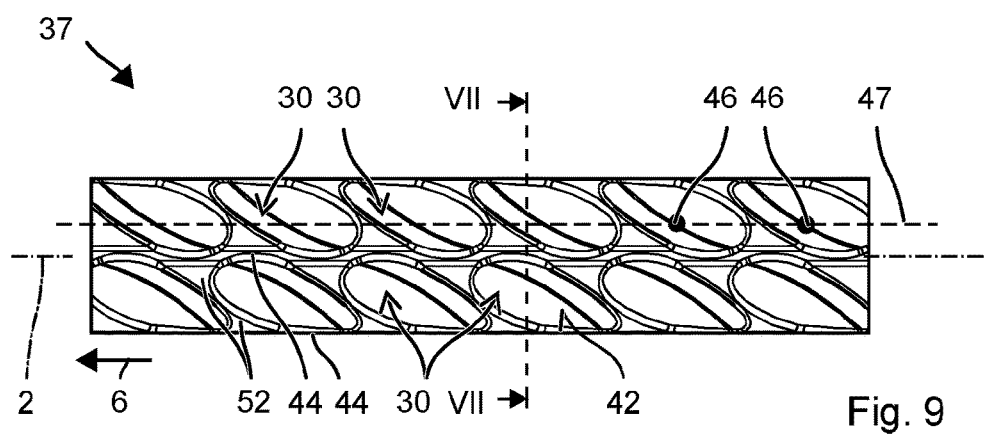
FIG. 9: a second side view of the semi-finished product, in the viewing direction IX.
Figure 10:
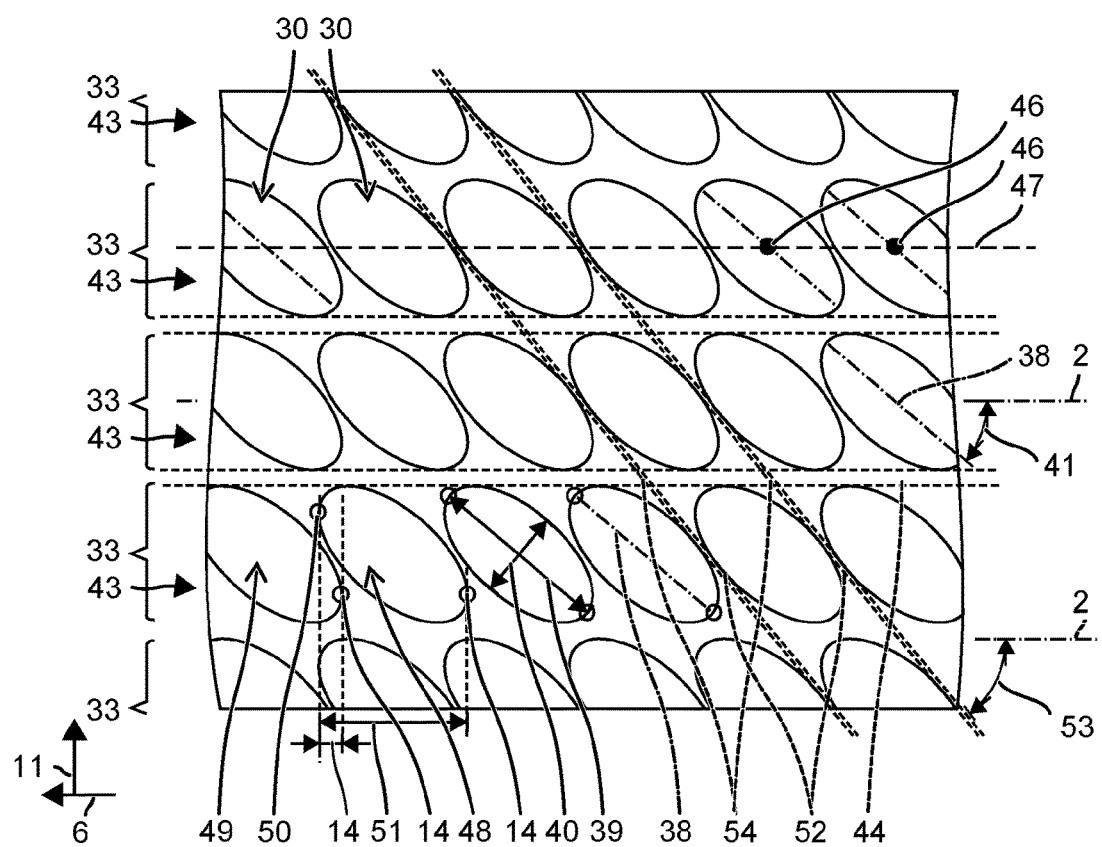
FIG. 10: an unrolled view of the surface of the semi-finished product.
Figure 11:
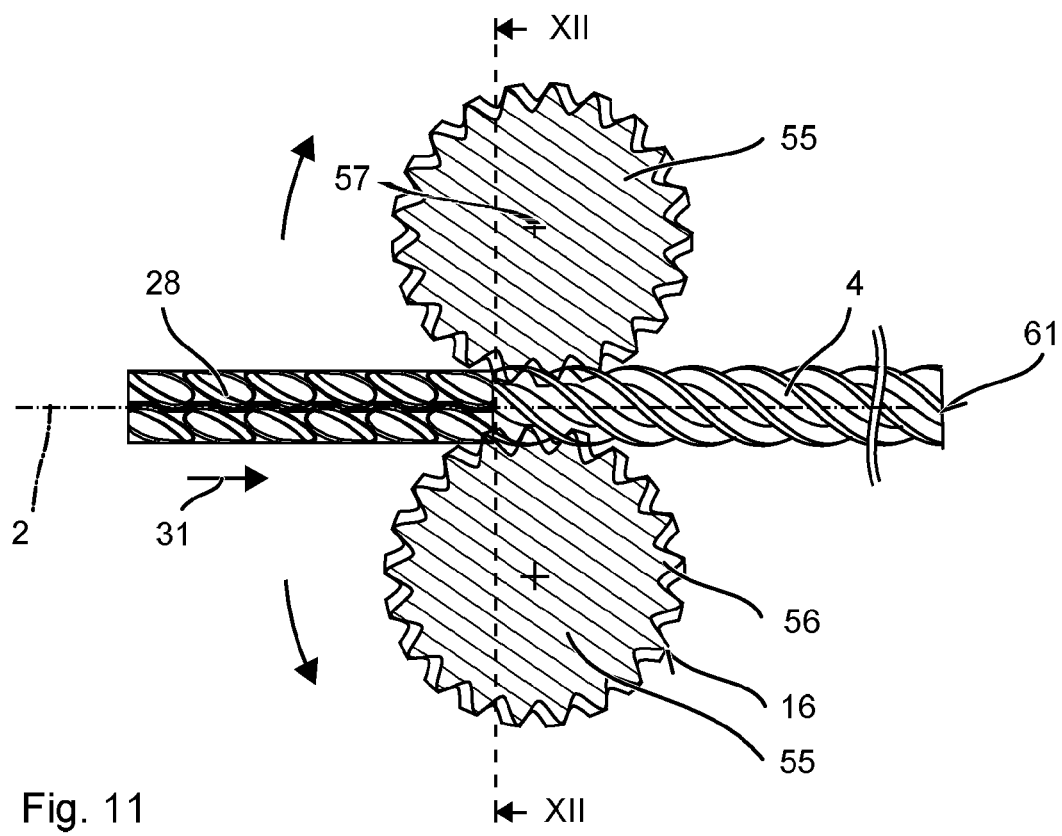
FIG. 11: a sectional view through a second rolling mill stand.
Figure 12:
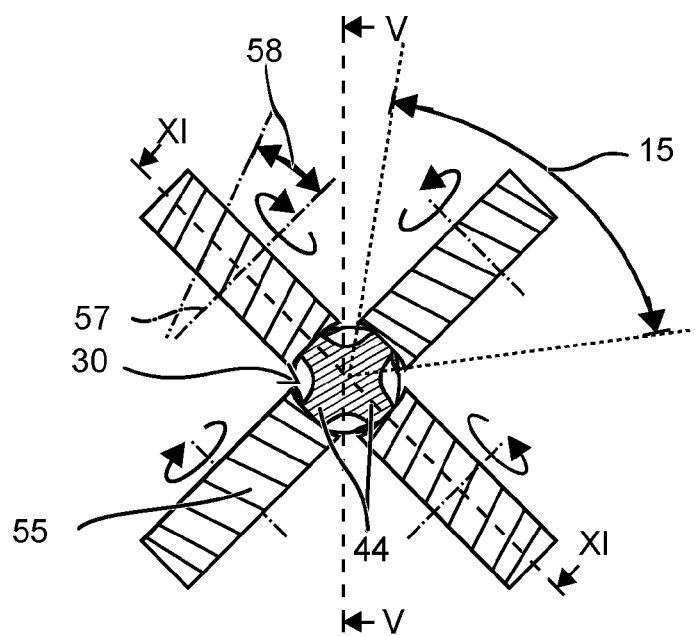
FIG. 12: a sectional view XII-XIII through the second rolling mill stand.

The blank 28 that has preferably been cold-formed using the milling tools 29, hereinafter referred to as the semi-finished product 37, is shown in FIGS. 7, 8 and 9. FIG. 7 shows an enlarged cross sectional view in the plane VII-VII, FIG. 8 depicts a side view in the direction VIII, FIG. 9 shows another side view in the direction IX, and FIG. 10 is an unrolled view around the axis 2.

The depressions 30 milled into the semi-finished product 37 have an elliptical or rhomboidal contour by way of an example. The depressions 30 are configured so as to be identical.

A longitudinal axis 38 of the depression 30 runs through the two ends of the depression 30 that are farthest apart, thus defining their largest dimension 39. The dimension 39 of the depression 30 along the longitudinal axis 38 is preferably more than twice as large as the dimension 40 of the depression 30 perpendicular to the longitudinal axis 38. The longitudinal axis 38 of the depression 30 is slanted by an angle of inclination 41 relative to the axis 2 of the semi-finished product 37. The angle of inclination 41 is preferably between 30° and 60°.

The surface 42 of the depression 30 is preferably concavely cylindrical or concavely prismatic. The depression 30 is essentially in the form of a section through a circular or elliptical cylinder with the cylindrical blank 28. The depression 30 is not curved parallel to the longitudinal axis 38, whereas, in all other directions, it is concave with a constant or varying, positive curvature. As an alternative, the depression 30 can be designed so as to be lenticular. The depression 30 is convex in every direction, that is to say, it is positively curved, also along the longitudinal axis 38. The curvature of the surface 42 parallel to the longitudinal axis 38 is greater than the curvature of the surface 42 perpendicular to the longitudinal axis 38. A negative curvature, that is to say, a concave line, of the depression 30 is not desired in any embodiment, not even along the longitudinal axis 38 that has the least pronounced curvature.

The depressions 30 are arranged in four rows 43 by way of an example. The rows 43 are preferably oriented parallel to the axis 2, and accordingly, each row 43 runs in a different angular section 33. Therefore, the depressions 30 that are adjacent in the circumferential direction 11 do not have any overlap in the circumferential direction 11. In this context, a rotation of the blank 28 around its axis 2 during the milling of the depressions 30 is prevented.

The rows 43 that are adjacent in the circumferential direction 11 are each separated from each other by an axially running rib 44. The axially running ribs 44 are largely parallel to the axis 2 and they extend without interruptions, preferably over the entire length of the blank 28, at least along the section of the blank 28 that has been provided with the depressions 30. A radial height 45 of the ribs 44, namely, their outer dimension relative to the axis 2, is always the largest radial dimension in each cross section. The outer dimension of the semi-finished product 37 is greater than the outer dimension of the original blank 28.

The depression 30 has a deepest point 46 that is at the smallest distance 21 from the axis 2. This deepest point 46 is in the center in the case of the preferably largely symmetrical depression 30. The distance from the surface 42 to the axis 2 increases monotonically, preferably strictly monotonically, along with the distance to the deepest point 46. The deepest points 46 of the depressions 30 of a row 43 are preferably on a line 47 that is parallel to the axis 2.

Adjacent depressions 30 within one row 43, in other words, depressions 30 that are adjacent to each other along the axis 2, overlap along the axis 2. This is shown in the figures by way of an example for the front depression 48, which is followed by the rear depression 49 in the axis-parallel direction 6. A plane 11 that runs perpendicular to the axis 2 intersects both depressions 48, 49. The rear end 14 of the front depression 48 facing in the direction 6 is behind the plane 11 in the direction 6. Conversely, the front end 50 of the rear depression 49 facing in the direction 6 is in front of the plane 11 in the direction 6. Relative to the dimension 51 of the depression 30 parallel to the axis 2, the depression 30 overlaps the axially adjacent depression 30 by a length 14 amounting to between 10% and 20%.

The adjacent depressions 30 within one row 43 are separated by ribs 52 that are inclined relative to the axis 2 and that are hereinafter referred to as slanted ribs 52. The slanted ribs 52 are parallel to each other and are slanted at an angle of inclination 53 relative to the axis 2. The slanted ribs 52 extend continuously and equally to the axial ribs 44 over the entire length of the blank 28, or over the entire area with the depressions 30. The slanted ribs 52 protrude beyond the cross section of the original blank 28. The material pushed out of the depressions 30 is distributed over the ribs 44, 52. The height of the slanted ribs 52 can be smaller than the height of the axial ribs 44, especially in the overlapping area of adjacent depressions 30.

The axial ribs 44 and the slanted ribs 52 intersect each other at points of intersection 54. The ribs 44, 52 form a network-like surface structure whose interstices are formed by the depressions 30.

The semi-finished product 37 provided with the network is fed to a second rolling mill stand equipped with four second milling tools 55. The second rolling mill stand mills the depressions 30 in continuous helical grooves 15 (four of which are shown here) by means of longitudinal milling. The rotational or pivot axes 55 of the milling tools 55 are perpendicular to the advancing direction and to the axis 2 of the semi-finished product 37. The second milling tools 55 are preferably identical and are preferably arranged at equidistant angles around the axis 2.

Each of the milling tools 55 processes a different angular section 15 of the semi-finished product 37. The milling tools 55 that are adjacent in the circumferential direction 11 preferably touch each other in such a way that the milled surfaces form a closed ring around the axis 2 of the semi-finished product 37. An axial section of the semi-finished product 37 is formed simultaneously from all sides and the axial section shifts continuously along the axis 2.

The semi-finished product 37 is fed to the second rolling mill stand at a defined angular orientation. In the embodiment shown, the second rolling mill stand is rotated by 45° relative to the first rolling mill stand. The axial ribs 44 are each situated in the center, or approximately in the center, relative to the milled surfaces. The angular section 15 processed by the second milling tool 55 overlaps the depressions 30 of the semi-finished product 37 by precisely two adjacent rows 43. In this process, the second milling tool 55 forms one of the axial ribs 44. Accordingly, the number of second milling tools 55 is equal to the number of axial ribs 44.

The angular section 15 covered by the second milling tool 55 can be delimited in the circumferential direction 11 by the deepest points 46 of the depressions 30 of the two processed rows 43.

The milling tools 55 have a shape that is analogous to a helically toothed wheel having several teeth 56. The head line 16 of the teeth 56 is slanted relative to the rotational axis 57 of the milling tool 55 by an angle of inclination 58. The angle of inclination 58 is between 30° and 60° and is selected in accordance with the desired helical pitch. Advantageously, the angle of inclination 58 of the helical pitch matches the angle of inclination 53 of the slanted ribs 52 to within less than 5° in order to compensate for cutting effects.

Diverging from a prismatic shape, the teeth 56 have a circularly concavely curved head line 16. The curvature is approximately the same as the curvature of the helix bottom 19 that is to be produced. The height of the teeth 56 decreases monotonically from the edge towards the center along the rotational axis, and subsequently increases monotonically up to the edge. During the milling process, the teeth 56 preferably touch the deepest points 46 of the semi-finished product 37 with the edge of the head line 16, but without shaping them.

Figure 13:
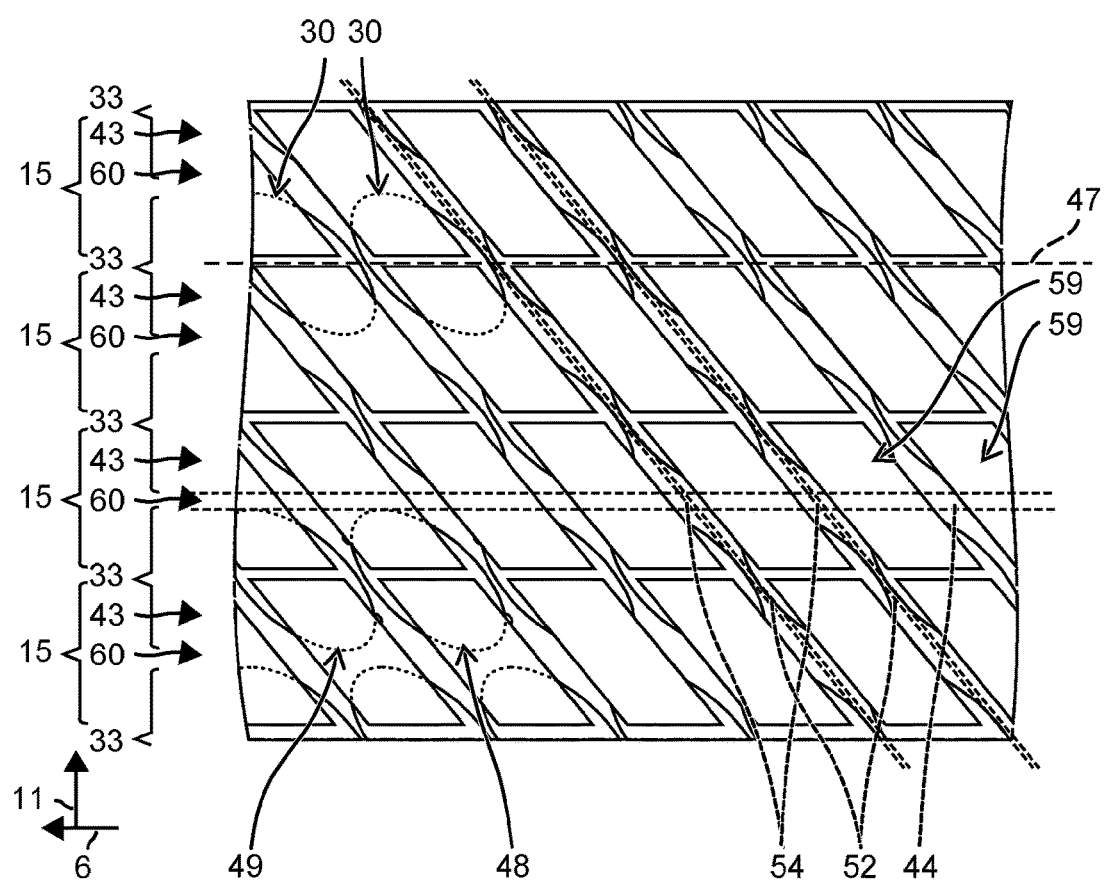
FIG. 13: an unrolled surface of the semi-finished product downstream from the second rolling mill stand.

FIG. 13 schematically shows an unrolled view of the semi-finished product 37 that has been milled over by the second rolling mill stand. The depressions 30 milled by the first rolling mill stand define the course of the axial ribs 44 and of the slanted ribs 52. The second milling tools 55 mill over the axial ribs 4 with rhomboidal grooves 59. Analogously to the depressions 30, the grooves 59 are arranged in rows 60 parallel to the axis 2, said rows 60 matching the appertaining angular sections 15. The inclination 58 of the teeth 56 is transferred into in the rhomboidal shape of the grooves 59.

First of all, the grooves 59 are positioned in a defined manner in the circumferential direction 11 in order to form the axial ribs 44. Secondly, the grooves 59 are positioned along the axis 2 between the slanted ribs 52. The axial rib 44 is thus shaped essentially only between its points of intersection 54 with the slanted ribs 52.

The grooves 59 are delimited along the axis 2 by the second ribs 52 and they are open in the circumferential direction 11, to be more precise, in a direction parallel to the second ribs 52. The dimension of the groove 59 is correspondingly identical along the axis 2 or else is it up to 20% smaller than the axial dimension of the depression 30. The dimension of the grooves 59 in the circumferential direction 11 is greater than half the dimension of the depressions 30 in the circumferential direction 11.

Parallel to the slanted ribs 52, the surface 42 of the grooves 59 is concave, that is to say, it has a negative curvature. The grooves 59 preferably have the curvature of the helix bottom 19. The smallest distance 26 from the grooves 59 to the axis 28 differs by less than 10% from the distance 21 of the deepest point 46 to the axis 28.

The drilling head 3 preferably consists monolithically of a metal carbide. An end face of the finished helix 4 is provided with a seat into which the drilling head 3 is inserted and integrated with a material bond. The seat can have slits that are formed complementarily to the edges in order to insert the drilling head 3 partially into the helix 4 with a positive fit. As an alternative, the drilling head 3 can be welded or hard-soldered onto the helix 4 with butt seam.

The end of the helix 4 opposite from the drilling head 3 is provided with the insertion end 5. For this purpose, the blank 28 is left in its original cylindrical shape, for example, in a section provided for the insertion end 5. Grooves for a rotary catch and a latch are formed or milled into the end. The insertion end 5 can also be made separately and then welded or hard-soldered onto the helix 4.

What is claimed is:

1. A production method for a twist drill comprising the following steps:
   milling a plurality of depressions into a circumferential surface of a blank in order to form a network of ribs, first ribs of the ribs being parallel to each other and running along an axis of the blank, while second ribs of the ribs are parallel to each other and run at an angle of inclination slanted relative to the first ribs;

milling grooves into sections of the first ribs situated between adjacent second ribs; and forming a drilling head on an end face of the milled blank, wherein the grooves are milled at a depth deviating by less than 10% from a depth of the depressions.

2. The production method as recited in claim 1 wherein the depressions are milled in rows oriented parallel to each other and along the axis.

3. The production method as recited in claim 1 wherein the depressions adjacent to each other along the axis overlap along the axis.

4. The production method as recited in claim 1 wherein the depressions adjacent to each other in a circumferential direction are at a distance from each other in the circumferential direction.

5. The production method as recited in claim 1 wherein a surface of the depressions is concave in every direction.

6. The production method as recited in claim 1 wherein the grooves run parallel to the second ribs.

7. The production method as recited in claim 1 wherein a surface of the grooves is convex in a direction parallel to the second ribs.

* * * * *